US00RE35165E

United States Patent [19]

Seng

[11] E Patent Number: Re. 35,165

[45] Reissued Date of Patent: Mar. 5, 1996

[54] PILE DRIVING APPARATUS

[75] Inventor: Kong S. Seng, Jakarta Selatan, Indonesia

[73] Assignee: V-Pile Technology Luxembourg, Luxembourg

[21] Appl. No.: 319,080

[22] Filed: Oct. 6, 1994

Related U.S. Patent Documents

Reissue of:

[64] Patent No.: 5,161,625
Issued: Nov. 10, 1992
Appl. No.: 860,240
Filed: Mar. 27, 1992

U.S. Applications:

[63] Continuation of Ser. No. 338,113, Mar. 14, 1989, abandoned.

[30] Foreign Application Priority Data

Apr. 15, 1988 [GB] United Kingdom ..... 8808988

[51] Int. Cl.[6] ..... E21B 1/00

[52] U.S. Cl. ..... 173/53; 173/90; 405/232

[58] Field of Search ..... 173/53, 90, 91, 173/163, 164; 405/232, 244

[56] References Cited

U.S. PATENT DOCUMENTS

| | | | |
|---|---|---|---|
| 3,860,122 | 1/1975 | Cernosek | 173/90 X |
| 4,258,796 | 3/1981 | Horning et al. | 173/164 X |
| 4,475,604 | 10/1984 | Albertson et al. | 173/164 X |
| 4,555,090 | 11/1985 | Averhoff | 254/29 R |

FOREIGN PATENT DOCUMENTS

| | | |
|---|---|---|
| 0003063 | 7/1979 | European Pat. Off. . |
| 0265859 | 4/1988 | European Pat. Off. . |
| 678500 | 9/1952 | United Kingdom . |
| 1161796 | 8/1969 | United Kingdom . |
| 1268995 | 3/1972 | United Kingdom . |
| 1332257 | 10/1973 | United Kingdom . |
| 1393389 | 5/1975 | United Kingdom . |
| 1395440 | 5/1975 | United Kingdom . |
| 1555552 | 11/1979 | United Kingdom . |
| 2028902 | 3/1980 | United Kingdom . |
| 1573384 | 8/1980 | United Kingdom . |
| 2080857 | 2/1982 | United Kingdom . |
| 2152986 | 8/1985 | United Kingdom . |
| 2177143 | 1/1987 | United Kingdom . |
| 87/02726 | 5/1987 | WIPO . |

OTHER PUBLICATIONS

A. C. Meigh, *Cone penetration testing methods and interpretation* (1987), pp. v, viii, ix, x, xi, xii, xiii, 3–15, and 18–25.

*Primary Examiner*—Willmon Fridie
*Attorney, Agent, or Firm*—Popham, Haik, Schnobrich & Kaufman, Ltd.

[57] ABSTRACT

A pile driving apparatus comprises a base frame (1) having a platform (3) for supporting ballast (5). The base frame (1) is equipped with a leveling device (7). The pile driving apparatus comprises a column (11) positioned perpendicular with respect to the base frame and supported by steel supports (13). At the top of the column (11) is provided a lifting point (17). A pile loading device consists of a cradle arm (19) which is pivotally mounted at point (21) to the base frame (1) at the lower end of the column (11). A hydraulic jack (23) is operative for moving the cradle arm for loading piles to the device. A hydraulic piston (29) bears a load onto a jack thrust plate (33), which plate is connected to a transmission plate (35) by means of a shaped plate (77). The higher end of the transmission plate is ridgedly connected to a pile thrust plate (39) means of another shaped (41). The column (11) is provided with an elongate slit (43) so that when the hydraulic piston (29) edges downwardly against the thrust plate (33) correspondly downward thrust is applied to the transmission plate. This enables piles having a length substantially the same as the column (11) to be driven into the ground.

17 Claims, 4 Drawing Sheets

PILE DRIVING APPARATUS

Matter enclosed in heavy brackets [ ] appears in the original patent but forms no part of this reissue specification; matter printed in italics indicates the additions made by reissue.

This application is a continuation of U.S. patent application Ser. No. 07,338,113, filed Mar. 14, 1989 now abandoned.

This invention relates to pile driving apparatus, in particular to jack piling systems.

Jack piling apparatuses are usually confined to situations where piles must be driven into the ground and no significant vibration and noise is permitted. Several pile driving apparatuses have been proposed in the past. Several are discussed in "Pile Design and Construction Practice", third edition by M. J. Tomlinson, published in 1987.

Previously used jack piling apparatuses employ the use of a jack which bears down directly onto the top of the pile to be driven into the ground. These systems are frequently referred to as "jack-in piling systems". These systems are mainly used for underpinning foundations, but owing to their relative complexity, are not competitive with conventional piling systems and so are seldom used in new pile foundation works.

One previously used jack piling apparatus involves inserting a jack between the foundations to be under-pinned and the top of the pile to be driven into the ground. In this kind of system, the foundations themselves provide the reaction force t the jacking.

These systems are subject to many disadvantages. In particular, the setup and positioning of the pile, and mobilization of the Kentledge or ballast to provide the reaction is slow. Generally, a hydraulic jack is used, but are restricted to shorter strokes. This means that extensive use of dolly sections is required, at least six times to jack down one section of the pile. Moreover short and stout pile sections must be used, which means that the apparatus is only really suitable for larger bearing capacity piles (such as 40 tons above working load).

These systems are also disadvantageous in that the extension pile procedure is slow, and the joining of consecutive piles together, frequently done by welding, is inefficient.

Such jack-in piling systems can only install two pile positions per working day. This makes such jack-in piling systems uneconomical for extensive use even in the present pile foundation market.

It is an aim of the present invention to provide a pile driving apparatus which overcomes the aforementioned disadvantages.

According to the present invention, there is provided a pile driving apparatus comprising: jack means for exerting a pile driving force in one direction onto a pile to be driven via transmission means; and reaction means for providing a reaction force to the pile driving force; wherein the longitudinal axis of the pile lies substantially parallel to but spaced apart from the one direction and the transmission means is configured to transmit the driving force from the one direction to the pile thereby enabling at least a part of the jack means to extend alongside the pile.

The pile driving apparatus preferably includes a column for receiving the pile along its length on one side thereof, the length of the pile substantially corresponding to the length of the column.

The jack means may be fixed to one end of the column on the side of the column which is opposite from the side receiving the pile.

The transmission means may comprise a first thrust member for receiving a piston of the jack means, a second thrust member for urging against the free end of the pile, and a transmission member which links the first and second thrust members via an aperture extending along the length of the column.

The piston of the jack means is preferably capable of pushing the first thrust member along substantially half of the length of the column in a single stroke, thereby permitting driving of the pile in two strokes of the jack means.

A base frame is attached towards the lower end of the column, and comprises support means for supporting the apparatus, and leveling means for leveling the base and ensuring the column is at least substantially vertical.

The base frame is preferably arranged to support ballast or Kentledge for providing the reaction force to the pile driving force, the reaction force being transmitted between the ballast or Kentledge and the jack means via the column.

The column may be in the form of a steel "H" cross-sectional column.

According to the present invention, there is further provided a base frame for a jack piling apparatus, the base frame comprising support means for supporting a pile to be driven into the ground, and supporting a jack means for driving the pile into the ground, and for supporting ballast or Kentledge for providing a reaction force to the jack means, wherein the base frame includes leveling jacks operative to adjust the base frame so that the pile ca be made to be substantially vertical.

The base frame is constructed so as to be sufficiently stiff to resist distortions due to the reaction force which occurs during pile driving.

According to the present invention, there is provided a pile loading device for loading piles into a pile driving apparatus, the pile loading device comprising an elongated cradle which is pivotally connectable to the apparatus so that the cradle can be moved between horizontal and vertical positions, and a jack for moving the cradle about the pivotal point, wherein the cradle is configured to receive a pile when in the horizontal position, and to be moved into a vertical position by means of the jack thereby enabling positioning of the pile for driving into the ground.

The loading device is preferably provided with means for guiding the end of the pile closest to the pivotal end of the cradle for locating it with the exposed end of the previously driven pile.

The pile loading device is also configured for placing a dolly onto a partially driven pile.

The guiding means may be adjustable to accommodate different pile profiles.

The pile loading device and/or base frame may be incorporated into the pile driving apparatus as defined hereinabove.

Embodiments of the invention may include a jointing apparatus for connecting adjacent piles end-to-end, and for restraining relative movement between the piles in the 3 degrees of rotational motion, and the 3 degrees of translational motion.

According to the present invention, there is provided a jointing apparatus preferably comprises a plate having a cross-section corresponding substantially to that of the pile to be driven, bonding means extending from one side of the plate around which the pile is cut thereby enabling bonding of the plate to the pile, and a channel formed in the plane of the plate and for receiving a leg of a substantially "C" or "U" shaped clip such that there can be no relative movement between the clip and the plate.

The other leg of the clip can be received by a corresponding recess of a corresponding plate case into another pile. Positioning of the plate clip in this way joins the piles and prevents relative movement therebetween.

A plurality of channels may be formed in end plate for receiving a corresponding number of clips thereby providing extra security against relative movement between adjacent piles.

The pile driving apparatus of the present invention, which may include the base frame and/or the pile loading device, may be suspended from or attached to a mobile crane.

Instead of mounting the apparatus on a base frame, the apparatus may be mounted onto a mobile base machine which has sufficient weight to provide the reaction force as shown in FIG. 5.

Embodiments of the present invention provide significant advantages over previously used jack-in pile driving systems.

A significant advantage is afforded by the pile driving apparatus of the present invention owing t the indirect application of the driving force from the jack means to the pile.

The advantages are as follows: a smaller but longer pile element having a pile bearing capacity ranging from 10to 40 tons (working load) can be driven; the ballast or Kentledge can be simply and quickly mobilized; the pile extension procedure can be carried out quickly without much manual labor; piles may be joined together simply and inexpensively; the hydraulic jack can install the section of pile by only two stokes thereby reducing the number of dolly usages (this leads to a speeding up of the overall pile driving process); and since at least a part of the jack means is arranged to extend alongside the pile, the length of the pile element can correspond to the available headroom, which in turn leads to a greater stability during driving of the pile.

Embodiments of the present invention thereby enable long jacking strokes and a faster piling extension procedure. Embodiments of the invention can install about 20 pile positions in a working day.

Embodiments of the present invention are therefore cost competitive with other existing pile systems which are not generally designed for underpinning works. Moreover, embodiments of the present invention do not preclude the use of twin or multiple hydraulic jack assemblies for providing the pile driving force.

Embodiments of the present invention may be used for pre-stressed concrete pile elements of various cross-sectional shapes, for example, triangular, "V" shaped square, round, hexagonal or tubular. Pre-stressed concrete pile elements are preferably pre-tensioned using a single pre-stressing wire along the central longitudinal axis of the pile. Several pre-stressing wires can also be used. Piles of 125 mm top 225 mm in lateral dimension may be used.

Embodiments of the invention enable use of pre-stressed concrete pile elements having effective pre-stress of less than 2 MPa. Piles made of other materials such as timber or steel may also be driven into the ground using embodiments of the present invention. Lengths of pile elements may, for example be between 3 and 6 meters long.

The invention will now be further described by way of example with reference to the accompanying drawings, in which.

Figure 1:
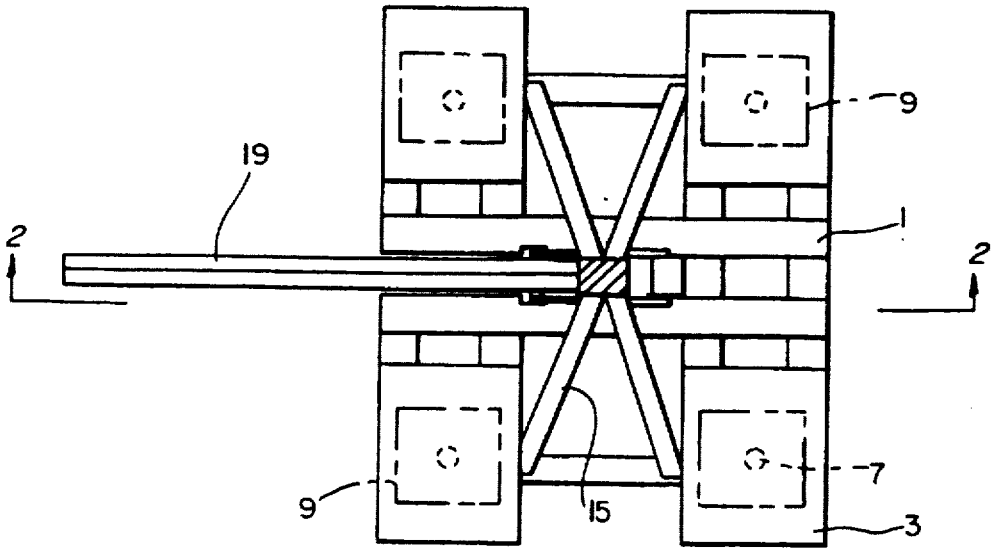
FIG. 1 is a sectional plan view taken along the lines A—A (of FIG. 2) of an embodiment of the present invention.
Figure 2:
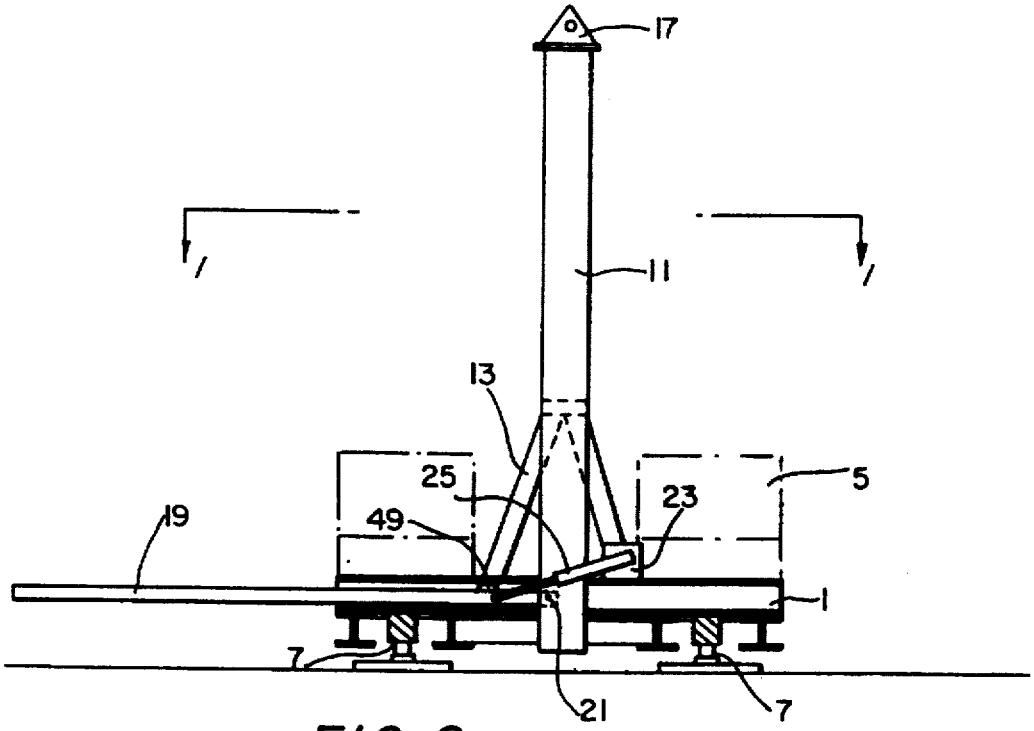
FIG. 2 is a sectional side elevation taken along the lines B—B of FIG. 1.

FIGS. 1 and 2 illustrate an embodiment of the invention which comprises a base frame 1 having a platform 3 for supporting ballast or Kentledge 5. The base frame 1 is preferably constructed of steel sections or steel plates which are sufficiently stiff to prevent any significant distortions occurring when the reaction force is applied during pile installation.

The base frame 1 is equipped with a leveling device in the form of jacks 7 positioned at each corner thereof. Each jack 7 can be adjusted independently of one another so as to ensure that the base frame lies substantially horizontally, and in particular, to ensure that a pile 8 (see FIG. 3) to be driven into the ground is vertical with respect to the ground.

The Kentledge or ballast may be weights totaling 40 tons. One 10 ton weight 9 may be positioned at each comer of the base frame 1 above a jack 7.

The pile driving apparatus comprises a column 11 positioned substantially perpendicular with respect to the base frame 1, and supported in position by means of steel supports 13. Bracing members 15 are provided on the base frame 1 in order to enhance the stiffness of the apparatus.

The column 11 will be described in detail below with reference to FIGS. 3 and 4. At the top of the column 11 is provided a lifting point 17 which can be attached to the hook of, for example, a mobile crane thereby enabling positioning of the apparatus.

The apparatus includes a pile loading device which consists of a cradle arm 19 which is pivotally mounted at point 21 to the base frame 1, at the lower end of the column 11. A hydraulic jack 23 is positioned on the base frame 1 and comprises a hydraulic piston 25 which is connected to the cradle arm 19. The operation of the cradle arm will be discussed below.

Figure 3:
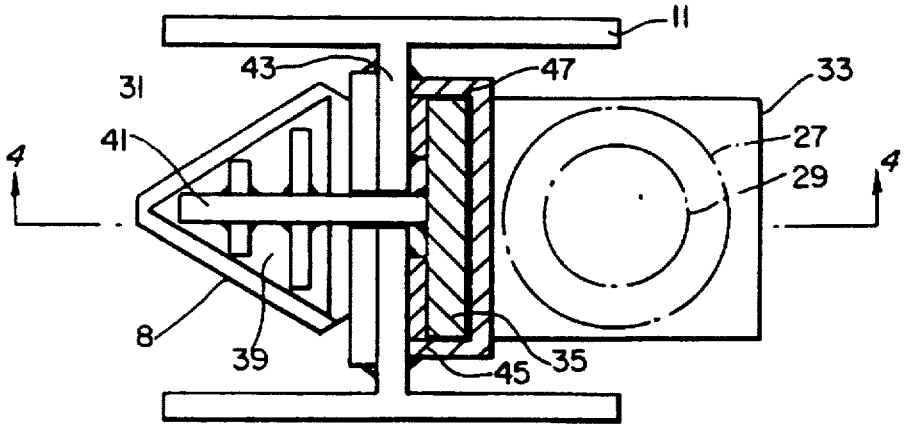
FIG. 3 is a detailed sectional plan view of pan of the embodiment of the present invention.
Figure 4:
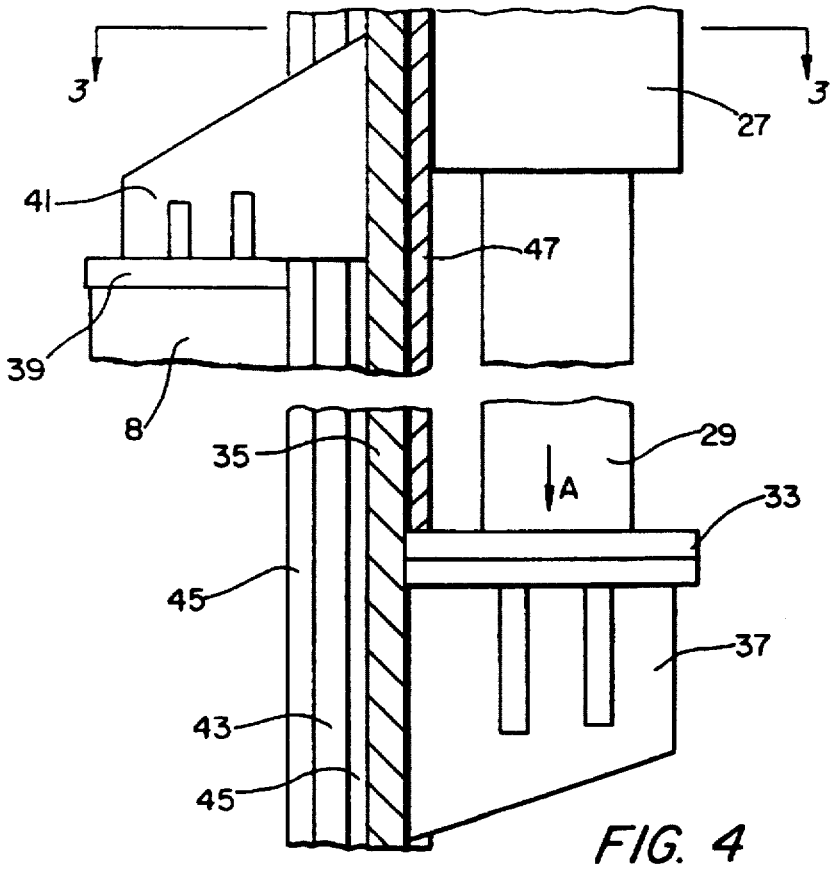
FIG. 4 is a pan sectional side elevational view of the embodiment taken along the lines B—B of FIG. 3.

FIGS. 3 and 4 illustrate the column 11 of the pile driving apparatus in more detail. The column 11 is constructed of a steel "H" profiled column which is of sufficient strength to transmit the reaction force from a jack means to the Kentledge. The jack means is in the form of a hydraulic cylinder 27 and a hydraulic piston 29. The hydraulic cylinder 27 is fixedly attached to the top end of one side of the column 11 by channel section and/or other suitable means. This side of the column 11 forms a hydraulic jack compartment of the pile driving apparatus.

The other side of the column 11 forms the pile compartment 31 of the pile driving apparatus. The pile compartment 31 receives the pile 8 for driving into the ground.

A transmission means transmits the pile driving force from the hydraulic cylinder 27 to the pile 8 contained in the pile compartment 31. The transmission means comprises a jack thrust plate 33 onto which the driving load of hydraulic piston 29 bears. The jack thrust plate 33 is rigidly connected to a transmission plate 35 by means of a shear plate 37 which is welded onto the transmission plate. The higher end of the transmission plate 35 is rigidly connected to a pile thrust plate 39 by means of another shear plate 41. The web portion 43 of the column 11 is provided with an elongate slit running along the longitudinal length thereof for accommodating the transmission plate 35 and for permitting the transmission plate to move along the length of the column 11. As can be seen from FIG. 4, when the hydraulic piston 29 urges downwardly against the jack thrust plate 33 in the direction of arrow A, a corresponding downward thrust is transmitted via the transmission plate 35 to the pile thrust plate 39.

The configuration of transmission means is such that the hydraulic cylinder 27 and the hydraulic piston 29 can extend alongside the pile to be driven into the ground. Consequently, piles having a length substantially corresponding to the height of the column 11 may be driven into the ground with embodiments of the present invention.

In order to enhance the stiffness of the column 11, stiffener plates 45 are welded along the length of the web portion 43 of the column 11. In the hydraulic jack compartment of the column 11, there is provided a channel section 47 which acts as a guide for the transmission plate 35. The channel section 47 also reduces the possibility of the transmission means twisting within the slit formed in the web portion 43.

The pile thrust plate 39 has a cross-section which corresponds to the cross-section of the pile 8. This thrust plate 39 makes contact with the pile to be driven into the ground.

The hydraulic piston 29 is capable of extending to substantially half of the length of the pile 8, thereby driving half the length of the pile into the ground in one stroke.

This embodiment is provided with the pile loading device which comprises the cradle arm 19 which is pivotally mounted at the point 21 to the base frame 1 at the lower end of the column 11. The operation of the pile loading device is as follows.

The cradle arm 19 is lowered, by means of the hydraulic jack 23 and piston 25, into a horizontal position as illustrated in FIG. 2. The pile element 8 is then lifted and placed horizontally onto the cradle arm 19 either manually or by crane. The hydraulic jack piston 25 then retracts causing the cradle ann 19 to swing into a vertical position together with the pile element to be loaded into the pile compartment 31 of the column 11. A guide 49 is provided on the cradle ann 19 which ensures that the lowermost end of the pile element is correctly located above the correct position on the ground, or if the pile element is an extension pile, the adapter 49 ensures that the lowermost end of the pile extension accurately locates with the top of the pile element already driven into the ground.

The guide 49 may be adjusted to accommodate piles of different profiles and sizes.

Figure 5:
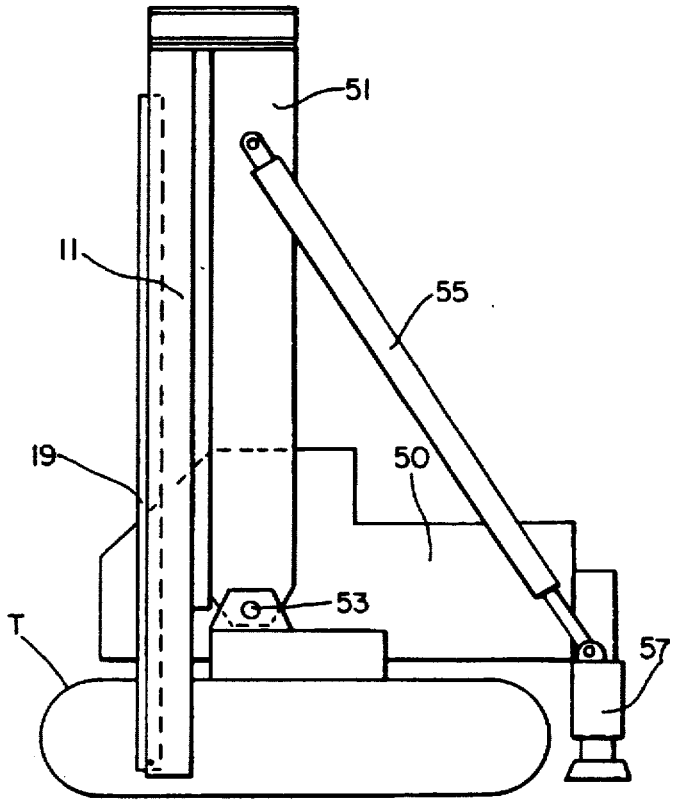
FIG. 5 is a schematic view of an embodiment of the invention supported by a mobile base machine.

FIG. 5 illustrates the pile driving apparatus of the present embodiment mounted on a mobile caterpillar type tracked vehicle base machine 50 having tracks T for effecting movement on the supporting terrains. The pile driving apparatus may be transported by the mobile base machine 50 as illustrated in FIG. 5. The column 11 is supported on the mobile base machine 50 by means of a steel hollow section column 51 which is pivotally supported at a point 83 of the mobile base machine 50. The pile driving apparatus can be deployed by means of the hydraulic arm 55. During deployment, the mobile base machine 50 can be stabilized by means of a stability jack 57.

Figure 6:
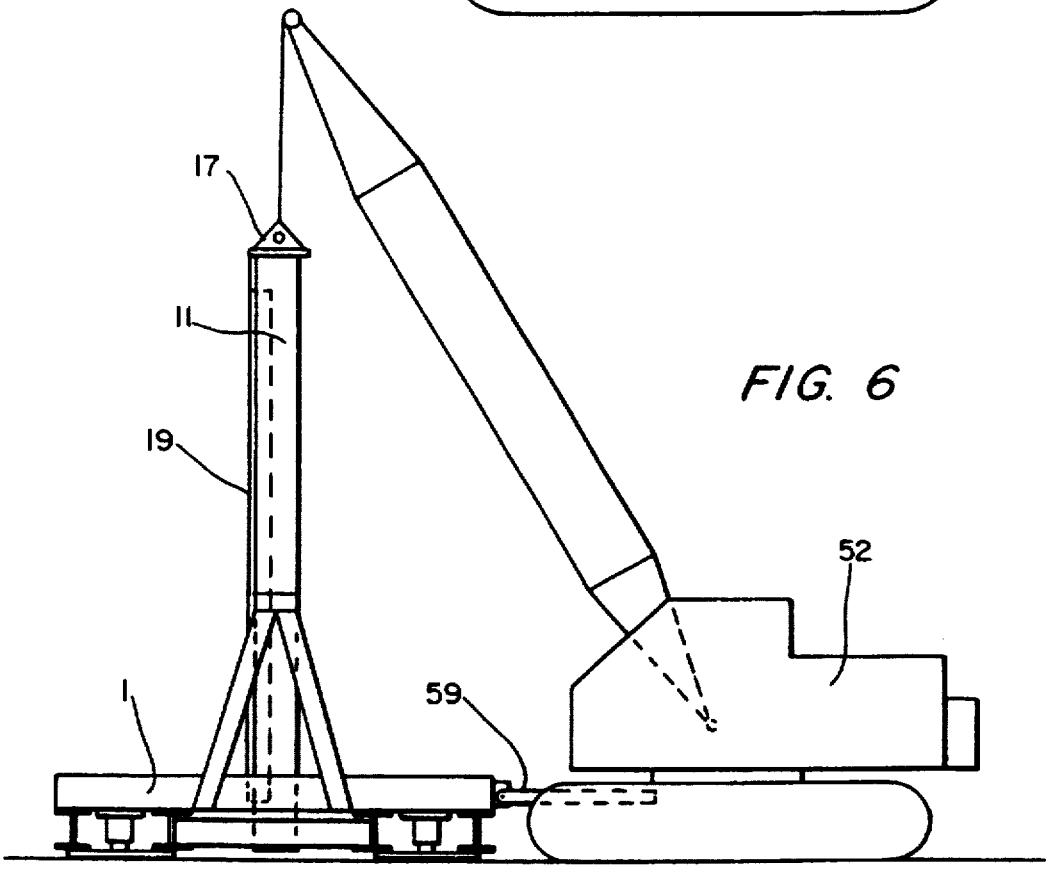
FIG. 6 illustrates an embodiment of the invention mounted on a static base frame which is positioned using a mobile crane.

FIG. 6 illustrates the pile driving apparatus mounted on a static base frame which is positioned using a mobile crane 52. The mobile crane also loads the Kentledge onto the base frame. The column 11 is suspended from the mobile crane 52 by means of a hook attached to the lifting point 17 of the column 11. The horizontal positioning of the base frame 1 can be controlled by means of a position control attachment 59 which can be controlled by the mobile crane 52.

The installation of piles by the embodiment of the invention will be described as follows.

The mobile base machine or crane may be capable of lifting a 10 ton load. The bearing capacity of the pile may be 16 tons working load, and the pile length per element may be 5 meters. During installation, the column 11 and base frame 1 are first lifted into place and positioned over the desired location. The four 10 ton Kentledge pieces are then lifted and placed into position on the base frame 1 to form the Kentledge. Leveling the base frame 1 can then take place in order to ensure that the column 11 is vertical.

While this is being done, the cradle arm 19 is lowered to the horizontal position in order to receive the pile element. The hydraulic jack 23 and 25 then lifts the cradle arm 19 and pile element into the pile compartment 31, and the pile thrust plate 39 is located on the top end of the pile.

The hydraulic cylinder and piston 27 and 29 can then drive the pile element, via the indirect jacking force method of the invention until, for example, half of the pile element is driven into the ground. The hydraulic piston 29 can then be retracted to its original position when the loading of the pile took place. During retraction of the piston 29, the cradle arm 19 is again lowered to the horizontal position in order to receive a steel dolly. The cradle arm 19 then lifts the dolly (not shown) into the pile compartment 31 with the dolly end resting fiat on the half embedded pile element.

The hydraulic piston 29 is then activated again and the dolly, which is equal in length to one half the pile length, pushes the remaining half of the pile element downwards. The cradle arm 19 can then be used to remove the dolly and further extension pile elements can then be driven into the ground using the above procedure.

Once the required pile penetration or bearing capacity has been reached, any pile elements protruding from the ground can be cut by means of an appropriate special cutter. The Kentledge can then be unloaded from the base frame and the apparatus then lifted to another pile position for repeat procedures.

Adjacent ends of extension piles may be connected together by means of the "clip in" jointing system of the present invention. An example of such a jointing system will be described below.

Figure 7A:
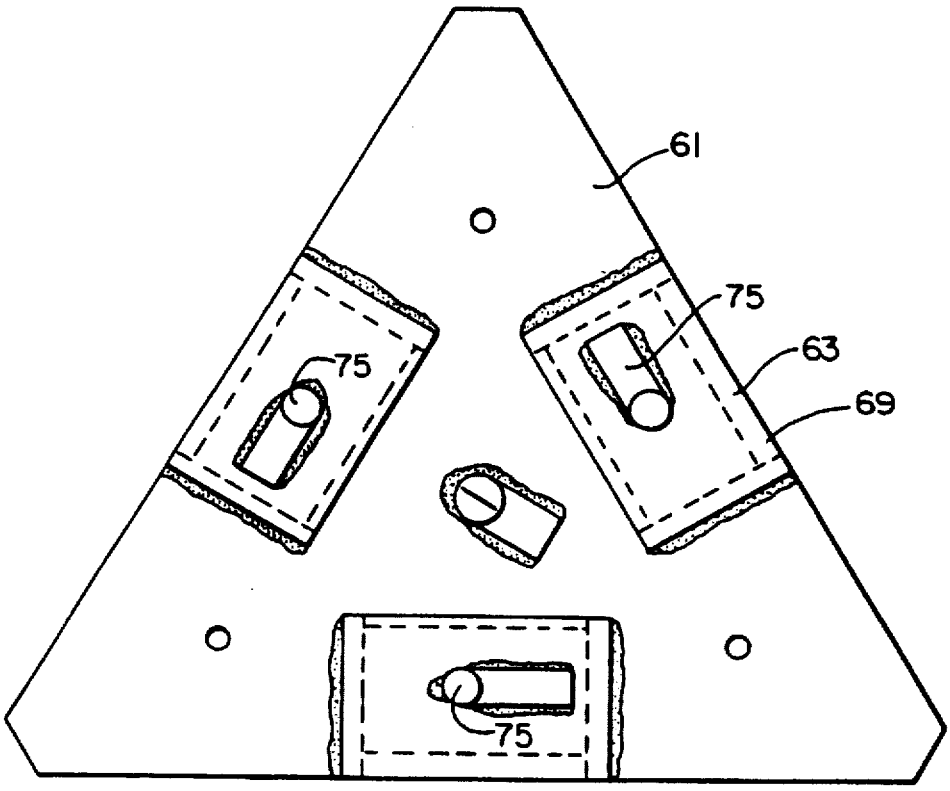
FIGS. 7a and 7b respectively show plan and side elevational views of a clip for clipping adjacent piles together.
Figure 7B:
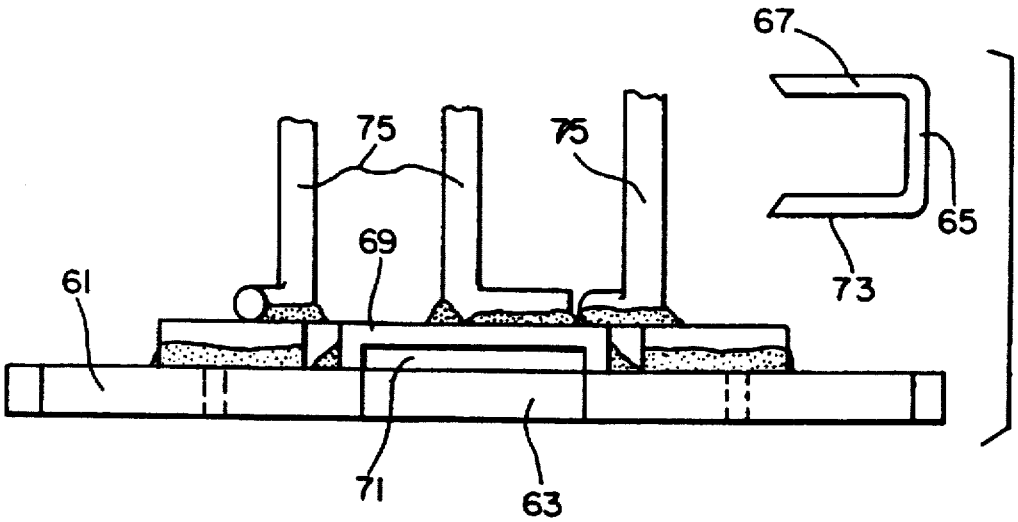

FIGS. 7a and 7b illustrate an embodiment of clip-in jointing system according to the present invention. The jointing assembly comprises a substantially "V"-shaped or triangular shaped plate 61 having the same cross-section as the pile element to be driven into the ground. A recess 61 for receiving a linking portion 65 of a substantially "U" or "C" shaped clip 67. A plate 69 is welded to the plate 61 at each of the recess points 63, and provides a channel 71 or hole for receiving a leg 73 of the clip 67. A bonding bar 75 is welded to each of the plates 69.

The end of the concrete pile is cast around the bonding bars 75 thereby securely bonding the plate 61 to the pile element.

Tensile stress resultants are transferred from the concrete pile element to the bonding bars 75 by interface bond. These stresses are in turn transferred through the channel shaped plate 69 and the V-shaped or triangular shaped plate 61 which have been welded to the bonding bars 75. Through contact stresses, the tensile stress resultants are transferred via the clip 67 to the adjacent pile end of similar construction.

For compressive stress resultants, these stresses are transferred through direct contact stresses between the V-shaped plate 61 of adjacent pile elements.

During installation of pile elements, as soon as the two pile elements have been positioned end-to-end, the two legs 73 of the clip 67 can be simply and easily inserted into the channels 71.

The clip 67 is slightly profiled during manufacture to provide a slight interference or press fit during insertion at the joint.

Three or more clips 67 are positioned in order to rigidly secure the pile end together thereby restraining relative movement therebetween in each of the 6 degrees of freedom (i.e. 3 rotations and 3 translations).

The advantages afforded by embodiments of the present invention can be contrasted with established jack-in pile systems as follows.

Existing jack-in pile systems are restricted to relatively short pile elements, typically of 0.76 to 1.2 meters in length owing to the ability of the pile element to be maneuvered by human strength. This leads to a large number of joints being required to install a pile. Embodiments of the invention enable the use of relatively long pile elements, typically 3 to 6 meters in length since the pile can be manipulated by the machinery instead of relying on human effort. Also, fewer joints are required.

Also in embodiments of the invention, moderate side dimensions of piles may be employed, for example, 100 mm to 200 mm, whereas in established systems 300 $mm^2$ precast concrete piles are used.

In existing systems, the existing foundation is often used to provide the reaction for the jacking forces. However, embodiments of the invention enable Kentledge to be placed on a mobile machine or on the base frame of the apparatus itself. The Kentledge can easily be moved to a new position where required, and is not restricted to the position of the existing foundations.

Embodiments of the invention are also advantageous in that they permit a long stroke of the jack, for example, 1.5 to 4 meters thereby enabling an entire pile element to be installed in two strokes. In contrast, conventional systems have a short jack stroke of, for example, 0.25 meters thereby requiring a multiple number of strokes required to install a single pile element.

Embodiments of the invention may incorporate the clip-in jointing system described hereinabove which enables the joints of adjacent piles to be established speedily. This contrasts with prior art arrangements wherein precast concrete elements are bonded together by inserting short steel bars into the longitudinal central hole, and subsequently grouting them with cement.

Embodiments of the present invention enable full use of the available headroom, the headroom corresponding substantially to the length of each pile element to be used. For example, a 3 meter length of pile element may be installed in the headroom of only 3.1 meters. This contrasts with the prior ar in which working headroom is required to accommodate both the length of the pile element and the hydraulic jack plus any packing. For example, a working headroom of about 1.8 meters enables installation of only a 1.2 meter length of open-ended steel tube.

Another difficulty with prior an arrangements is that the hydraulic jack and packing must be removed before another pile element can be added to the previous element already jacked into the ground. The jack is then put into position. In contrast, in embodiments of the invention the hydraulic jack 27 and 29, remains in position until the entire pile is installed to a required depth or bearing capacity.

Prior art arrangements are restricted for use in under-pinning existing foundations. However, embodiments of the invention make it competitive to be used for new building foundations. Embodiments of the invention are not only cheaper, and faster when used for under pinning existing foundations, but they will find substantial use for new foundations and are not restricted to under-pinning existing foundations.

Embodiments of the invention also enable the use of twin or multiple hydraulic jacks to be used for providing the jacking force.

I claim:

1. Pile driving apparatus comprising:

jack means positioned at least partially alongside a pile to be driven for exerting a pile driving force in a direction substantially parallel to but spaced apart from the longitudinal axis of the pile to be driven, at least a part of said jack means extending along-side the pile;

transmission means for transmitting the pile driving force from said jack means onto the pile;

reaction means for providing a reaction force to the pile driving force;

a column for receiving the pile to be driven, said column having an upper end and a lower end; and a base frame attached to said lower end of said column, said base frame including ballast support means for supporting ballast, said jack means being [positioned on said base frame.] *attached to said column.*

2. The pile driving apparatus of claim 1, wherein said column has opposed first and second sides, said column receiving the pile along its length on said first side thereof, and wherein the length of said column corresponds substantially to the length of the pile.

3. The pile driving apparatus of claim 1, wherein said column has opposed first and second sides, and wherein said jack means is fixed to one end of said column on said second side thereof.

4. The pile driving apparatus of claim 1, wherein said jack means includes a piston, and wherein said transmission means comprises a first thrust member connected to said piston, a second thrust member for urging against the free end of the pile, and a transmission member including aperture means for linking said first and second thrust members, said aperture means extending along the length of said column.

5. The pile driving apparatus of claim 4, wherein said piston of said jack means is adapted to push said first thrust member along substantially half or the length of said column in a single stroke, thereby permitting driving of the pile in two strokes of said jack means.

6. The pile driving apparatus of claim 1, wherein said base frame further includes column support means for supporting said column and leveling means for leveling said base frame and for maintaining the pile in a substantially vertical position.

7. The pile driving apparatus of claim 1, wherein the reaction force is transmitted between the ballast and said jack means through said column.

8. The pile driving apparatus of claim 1, wherein said column has opposed first and second sides, and wherein said jack means is fixed to one end of said column on said second side thereof.

9. The pile driving apparatus of claim 2, wherein said jack means includes a piston, and wherein said transmission means comprises a first thrust member connected to said piston, a second thrust member for urging against the free end of the pile, and a transmission member including aperture means for linking said first and second thrust members, said aperture means extending along the length of said column.

10. The pile driving apparatus of claim 3, wherein said jack means includes a piston, and wherein said transmission means comprises a first thrust member connected to said piston, a second thrust member for urging against the free end of the pile, and a transmission member including aperture means for linking said first and second thrust members, said aperture means extending along the length of said column.

11. The pile driving apparatus of claim 5, wherein said base frame further includes column support means for supporting said column and leveling means for leveling said base frame and for maintaining the pile in a substantially vertical position.

12. The pile driving apparatus of claim 2, wherein said base frame further includes column support means for supporting said column and leveling means for leveling said base frame and for maintaining the pile in a substantially vertical position.

*13. Pile driving apparatus comprising:*

*jack means positioned at least partially alongside a pile to be driven for exerting a pile driving force in a direction substantially parallel to but spaced apart from the longitudinal axis of the pile to be driven, at least a part of said jack means extending alongside the pile;*

*transmission means for transmitting the pile driving force from said jack means onto the pile;*

*reaction means for providing a reaction force to the pile driving force;*

*a support for receiving the pile to be driven, said support having an upper end and a lower end; and*

*a base frame attached to said lower end of said support, said base frame including ballast support means for supporting ballast, said jack means being attached to said support.*

*14. The pile driving apparatus of claim 13, wherein said jack means includes a piston, and wherein said transmission means comprises a first thrust member connected to said piston, a second thrust member for urging against the free end of the pile, and a transmission member linking said first and second thrust members.*

*15. The pile driving apparatus of claim 14, wherein said piston of said jack means is adapted to exert a force on said first thrust member along substantially half of the length of said support in a single stroke, thereby permitting driving of the pile in two strokes of said jack means.*

*16. The pile driving apparatus of claim 13, wherein said base frame further includes leveling means for leveling said base frame and for maintaining the pile in a substantially vertical position.*

*17. The pile driving apparatus of claim 13, wherein the reaction force is transmitted between the ballast and said jack means through said support.*

* * * * *